United States Patent [19] — [11] 4,107,662

Endo et al. — [45] Aug. 15, 1978

[54] CHARACTER GENERATOR FOR VISUAL DISPLAY DEVICES

[75] Inventors: Hirohido Endo, Cupertino; Fumiyuki Inose, San Jose; Akio Komatsu, Cupertino, all of Calif.

[73] Assignee: Hitachi, Ltd., Tokyo, Japan

[21] Appl. No.: 658,390

[22] Filed: Feb. 17, 1976

[51] Int. Cl.[2] ............................................ G06K 15/20

[52] U.S. Cl. ......................... 340/324 AD; 340/324 M

[58] Field of Search ................... 340/324 AD, 324 M; 178/DIG. 3, 30

[56] References Cited

U.S. PATENT DOCUMENTS

| | | | |
|---|---|---|---|
| 3,462,547 | 8/1969 | Macovski | 178/DIG. 3 |
| 3,573,789 | 4/1971 | Sharp et al. | 340/324 AD |
| 3,786,478 | 1/1974 | King | 340/324 AD |
| 3,789,386 | 1/1974 | Itoh | 340/324 AD |
| 3,893,100 | 7/1975 | Stein | 178/30 |
| 3,918,039 | 11/1975 | Clark | 340/324 AD |
| 3,921,164 | 11/1975 | Anderson | 340/324 AD |
| 3,956,578 | 5/1976 | de Loye et al. | 178/DIG. 3 |
| 3,969,716 | 7/1976 | Roberts | 340/324 AD |

*Primary Examiner*—David L. Trafton
*Attorney, Agent, or Firm*—Jackson & Jones Law Corporation

[57] ABSTRACT

Binary patterns that define alphanumeric characters for display are stored in a character pattern memory in a size that is smaller than the pattern that will be needed for display purposes. Each such stored character pattern is expanded to the size of a display character pattern, at a time when that character is to be displayed, on a point by point basis of the stored pattern. The expansion of each point in a stored character pattern is accomplished by a relationship that takes into consideration the points surrounding the point to be expanded.

When a character requires a binary pattern that is not readily susceptible of this type of expansion, the full display size pattern must be stored in memory. This display size pattern is broken up into a plurality of smaller stored patterns and stored in memory as a plurality of adjacent smaller patterns. In effect, then, two different character pattern sizes are stored in memory. The display size patterns in memory are identified by indicia such as a flag in the first line of the stored pattern, or by a flag in the memory address codes. When such flag is detected, the display size pattern is read from memory, and displayed without being expanded. When such flag bit is not detected, the pattern is read from memory and expanded, prior to display. Use of the word "display" in this document refers to not only the visual display but also the printer device.

17 Claims, 12 Drawing Figures

FIG. 1
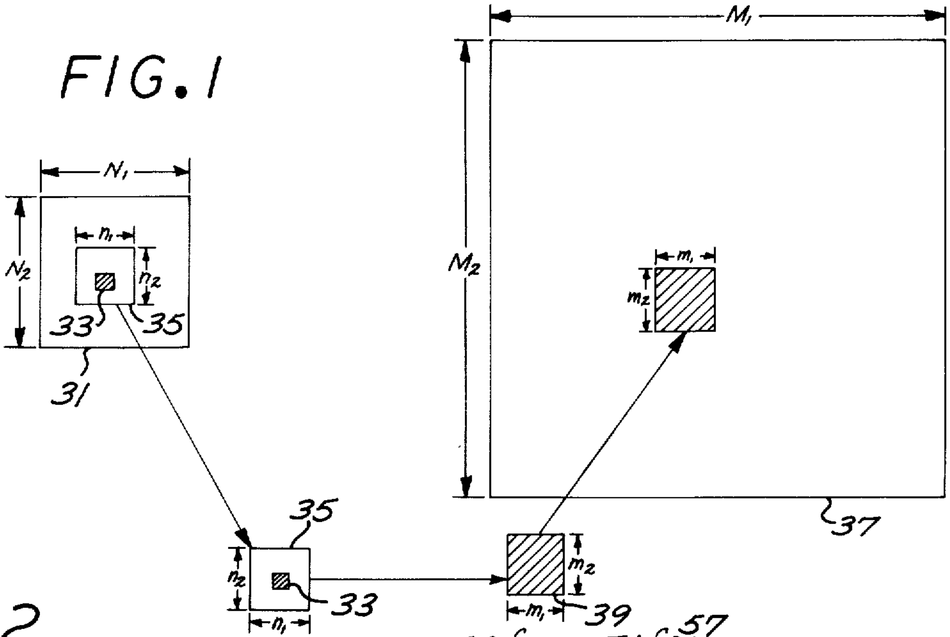
FIG. 2
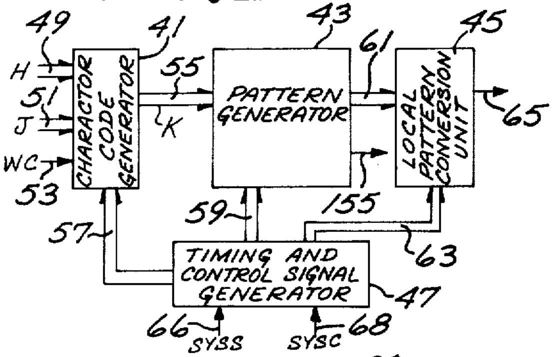
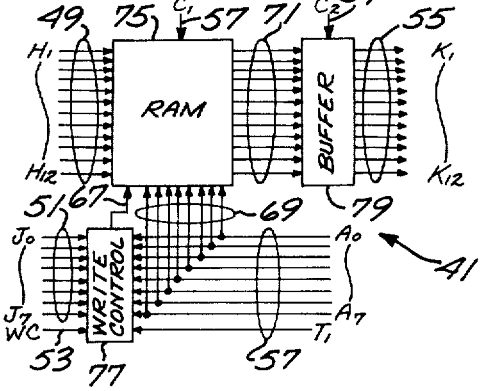
FIG. 3
FIG. 4
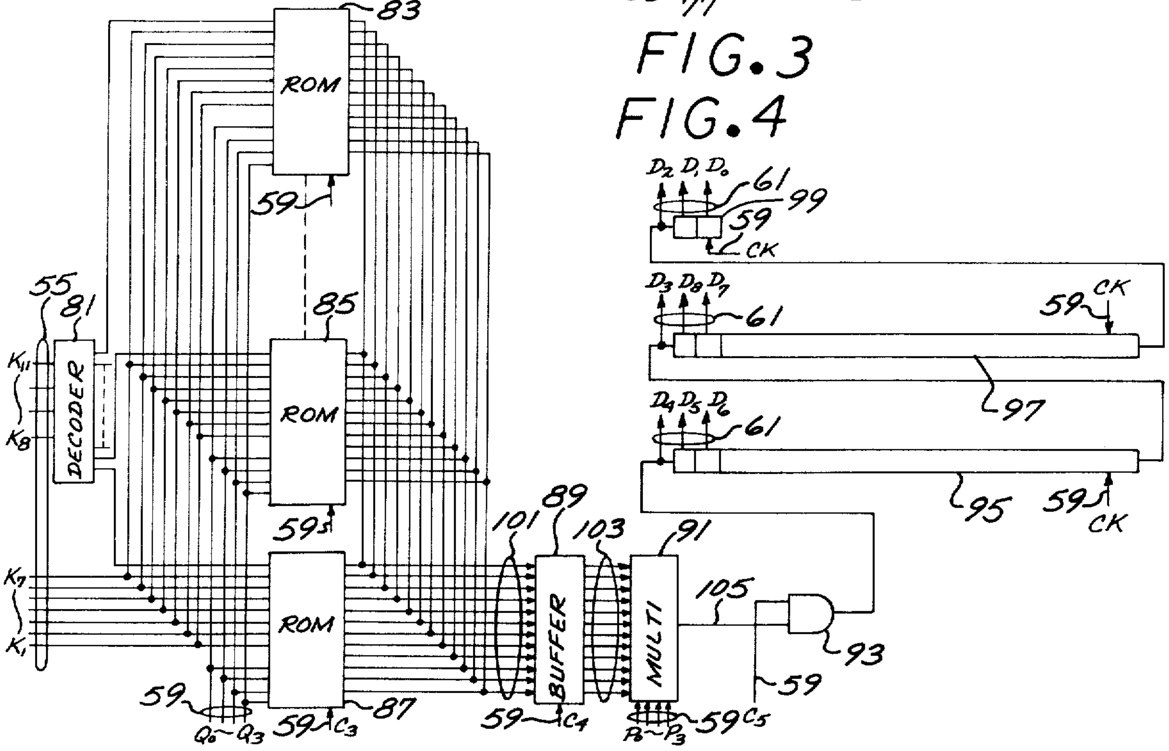

FIG. 10
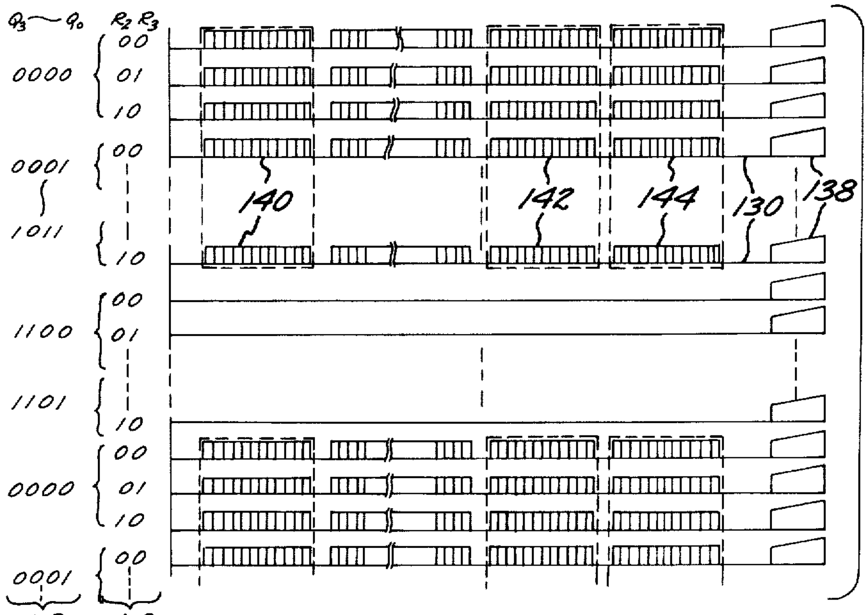
FIG. 11
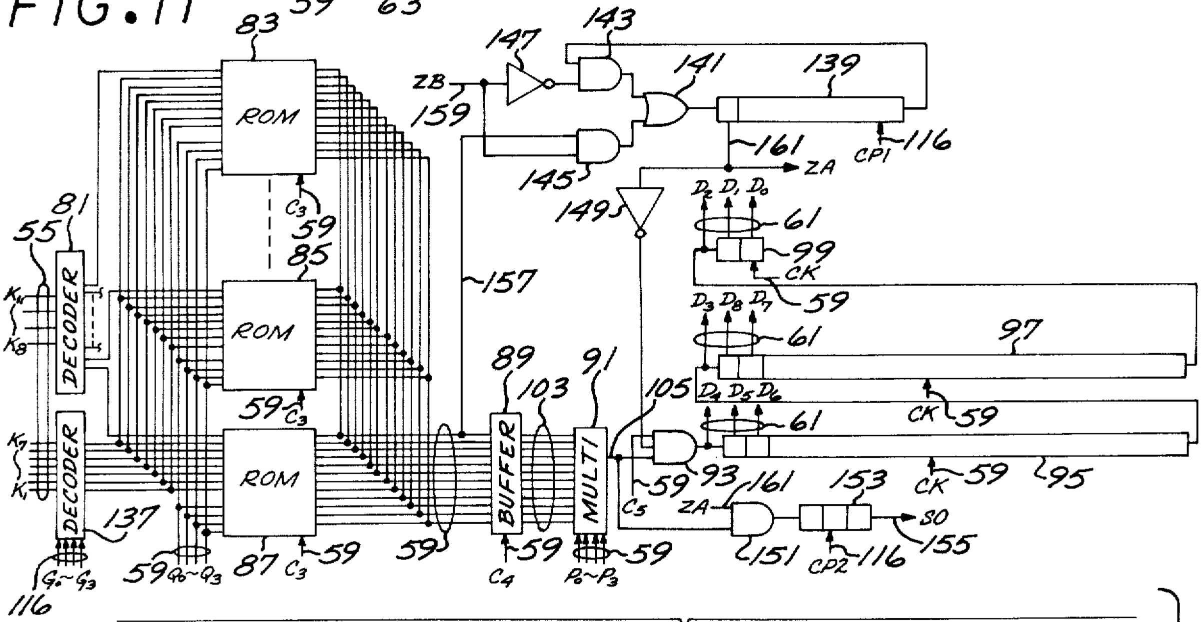
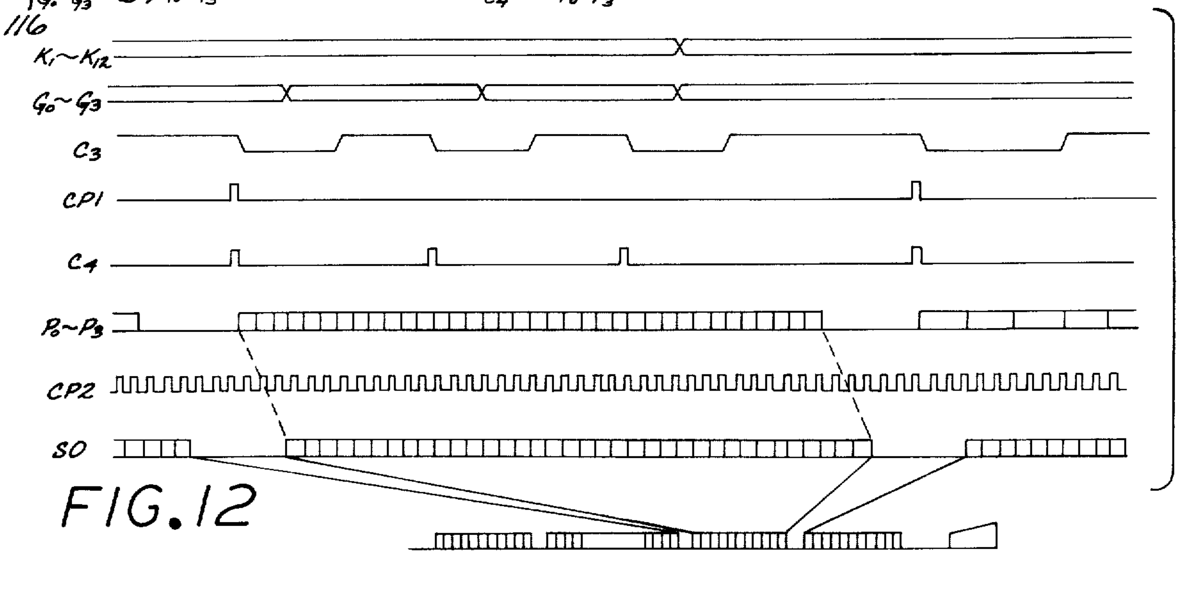
FIG. 12

CHARACTER GENERATOR FOR VISUAL DISPLAY DEVICES

BACKGROUND OF THE INVENTION

1. Field of the Invention

The present invention relates generally to improvements in character generators and more particularly pertains to new and improved method and apparatus for generating binary bit patterns used for the display of alphanumeric characters.

2. Description of the Prior Art

Present technology for alphanumeric character generation is sophisticated and extensive. In spite of all the technology and development in this area, however, the character generators are directed mainly at generating English and European language characters. Relatively few, if any, character generators exist for the generation of Japanese and Chinese characters. Those that do exist provide a very poor visual display of such characters. The reason for this lies, in part, in the characteristic of the Japanese and Chinese alphabets. These alphabets consist of a very large number of characters, for example, 2,300 characters. The individual characters are quite complex. Both of these characteristics require that very large capacity memories be used for storing even a partial library of such characters.

The present invention effectively reduces the number of bits needed to be stored in order to display an individual character of good visual quality. By sufficiently reducing the number of bits needed to be stored in order to display an individual character without reducing display quality, it then becomes feasible to manufacture Japanese or Chinese language character generators that are performance and cost competitive with existing character generators.

Although this invention is being described in connection with the generation of characters for a complex Asian alphabet, it should be understood that it has equal application to European and English alphabets with the effect of producing higher speed, lower cost character generators.

OBJECTS AND SUMMARY OF THE INVENTION

An object of this invention is to provide a character generator for display of complex characters.

Another object of this invention is to provide a vidio display character generator capable of generating a large number of different characters.

A further object of this invention is to provide a character generator that utilizes relatively small memory size for storing the character patterns.

Yet another object of this invention is to provide a character generator that expands a stored character pattern to a display size prior to display.

Still another object of this invention is to provide a character generator that expands a stored character pattern on a point by point basis, the expansion of each point occurring in regard to the points surrounding it.

Yet a further object of this invention is to provide a character generator that stores character patterns of different sizes.

Still a further object of this invention is to provide a character generator that generates characters by either reading a display pattern from memory directly, or reading a stored character pattern from memory and expanding it to a display pattern.

These objects and the general purpose of this invention are accomplished by storing the character pattern for each character in a matrix size that is smaller than the matrix size pattern required for display, the display size matrix being generated in response to the character pattern read from memory. The display size character pattern is generated by expanding each point of the stored pattern according to a relationship that takes into consideration the points surrounding the one being expanded.

In the instance when it becomes undesirable to store the character in a matrix size that is smaller than the matrix size required for display, the character is stored in display matrix size. Whether the character matrix addressed is of this type is indicated by an indicia such as a flag bit. If the flag bit is present, the matrix is read out and displayed. If the flag bit is not present, indicating the addressed matrix is not a display size matrix, the matrix is read out and expanded as above before being displayed.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 1 is a block diagram illustrating the concept of this invention.

FIG. 2 is a block diagram illustrating the apparatus of this invention.

FIG. 3 is a block diagram illustrating a portion of the apparatus of FIG. 2.

FIG. 4 is a partial block and logic diagram illustrating a part of the apparatus of FIG. 2.

FIG. 10 is a timing diagram illustrating how the character generator interfaces with the display.

FIG. 11 is a partial block and logic diagram of a portion of the invention as illustrated in FIG. 2, modified to provide an additional feature of the present invention.

FIG. 12 is a pulse diagram illustrating the timing relationship between the various signals being processed by the apparatus of FIG. 11.

DESCRIPTION OF THE PREFERRED EMBODIMENTS

Figure 5:
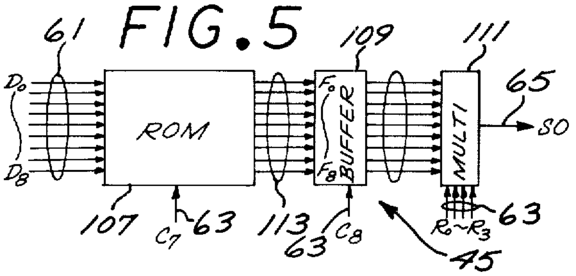
FIG. 5 is a block diagram illustrating part of the apparatus of FIG. 2.

In order to give the reader a better understanding of the structure and specific function of the instant invention, an explanation of the general concept of the invention will be presented first.

Referring to FIG. 1, the $M_1 \times M_2$ binary bit matrix 37 is the size required to be presented to a display device, such as a CRt, for the display of an individual character. It has been found that in order to provide a high quality display of a Chinese or Japanese character about a 36 × 36 matrix is required. In other words, $M_1 = M_2 = 36$. It should be understood, however, that the actual size of $M_1$ and $M_2$ is not critical. Thus, for example, $M_1$ and $M_2$ may equal 32. The $M_1 \times M_2$ binary bit matrix 37 is presented to the display device and is utilized thereby to generate an individual character in a manner that will be more fully described hereinafter.

In order to reduce the size of storage required for a large number of characters, each of which require a large binary bit matrix such as the $M_1 \times M_2$ matrix 37, the present invention stores an $N_1 \times N_2$ binary bit matrix 31 in memory. Each $N_1 \times N_2$ matrix defines its respective character. The size of binary bit matrix 31 may be, for example, 12 bits × 12 bits. In other words, $N_1 = N_2 = 12$. Or, $N_1 = N_2 = 16$. The exact size of the binary bit matrix 31 stored in memory for each character is not critical. However, it should be remembered that the $N_1 \times N_2$ binary bit matrix 31 stored in memory is smaller than the $M_1 \times M_2$ binary bit matrix 37 supplied to the display device for generating a character.

In order to expand the $N_1 \times N_2$ binary bit character matrix 31, stored in memory, to the $M_1 \times M_2$ binary bit character bit matrix 37 needed for display of that character, each bit position 33 within the $N_1 \times N_2$ matrix 31 is expanded in an appropriate ratio to form a plurality of bits 39 in the $M_1 \times M_2$ display matrix 37. Conceptually, this is accomplished in the following manner. As the $N_1 \times N_2$ stored character matrix 31 is to be expanded it is read out of memory in a bit by bit fashion. Each bit of the stored $N_1 \times N_2$ matrix 31 is associated with its surrounding neighbors. Thus, for example, the bit 33 is read out in an $n_1 \times n_2$ bit matrix 35. The $n_1 \times n_2$ matrix 35 may, for example, be a 3 × 3 bit matrix wherein the central point 33 of the 9 point matrix is the one to be expanded. This $n_1 \times n_2$ bit matrix 35, out of the $N_1 \times N_2$ stored character matrix 31 causes the generation of a bit matrix $m_1 \times m_2$ 39 which matrix defines the point 33 in its expanded display state. The specifics of exactly how the expansion occurs will be described in greater detail hereinafter.

FIG. 2 is a preferred embodiment illustrated in block diagram form of the present invention. A character code generator 41 receives character codes over a multiline cable 49 and stores such character codes at address locations indicated by addresses received over multiline cable 51 when dictated by a Write control signal on line 53. Timing and control signal generator 47 receives system sync signals over line 66 and system clock signals over line 68 and in response thereto supplies address and control signals over multiline cable 57 to the character code generator 41. The output of the character code generator 41 over multiline cable 55 is a multi-bit character code which, as will be seen hereinafter, triggers pattern generator 43 into generating a local pattern. This pattern is supplied over multiline cable 61 to the local pattern conversion unit 45, or over line 155 to a display device (not shown).

Timing and control signal generator 47 supplies control signals over multiline cable 59 to the pattern generator 43. The type of signals supplied will be more fully explained hereinafter. The local pattern conversion unit 45 receives the local pattern provided to it over cable 61 by the pattern generator 43 under the control of signals supplied to it over multiline cable 63 by the timing and control signal generator 47. Local pattern conversion unit 45 generates the expanded pattern to be displayed. It supplies this expanded pattern over line 65 to a display device (not shown).

The character code generator 41 is more specifically illustrated in FIG. 3 as comprising a random access memory (RAM) 75, a write control unit 77 and a buffer 79. For the purpose of example, a 12 bit character code $H_1 - H_{12}$, supplied to the RAM 75 over cable 49, is stored at an address in the RAM defined by the 8 bit address word $J_0 - J_7$ received over cable 51 by the write control unit 77. The write control unit 77 also receives a write command signal over line 53, an 8 bit cyclically generated RAM address $A_0 - A_7$, and a timing signal $T_1$ on cable 57, from the timing and control signal generator 47 over cable 57. The internally generated RAM address $A_0 - A_7$ is supplied over cable 69 to RAM 75.

The write control unit 77 generates a write command on line 67 whenever the externally generated RAm address $J_0 - J_7$ matches the internally generated address $A_0 - A_7$ and a write command and $T_1$ timing control signal is present. At that instant the character code $H_1 - H_{12}$ received by RAM 75 of cable 49 is written into memory at the address location directed by the address on cable 69. It is assumed, of course, that the clock signal $C_1$ on line 57 is also present.

The RAM access memory 75 is sufficient in size to store all the character codes necessary for a complete page of display on the display device. Thus, for example, the RAM 75 may be sufficient to store 256 character codes, each code being 12 bits long, i.e., a 3,072 bit RAM. If the write command signal on line 53 is not active, no write signal on line 67 is supplied to RAM 75 and the addresses $A_0 - A_7$ cyclically generated by the timing and control signal generator 47 on cable 57 will cause the character codes to be read out of RAM 75 onto cable 71 in that sequence. Thus, once the RAM 75 is loaded with a page of character codes to be displayed, the contents thereof are read out in sequence as dictated by the addressed $A_0 - A_7$.

Figure 9:
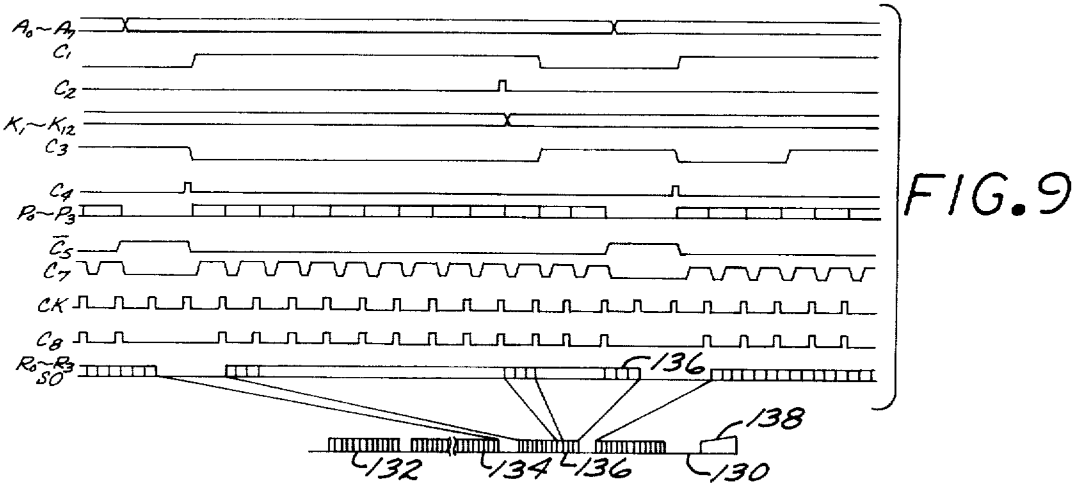
FIG. 9 is a pulse diagram illustrating the timing relationship between the various signals being processed by the hardware of the previous Figures.

Each character code read from RAM 75 over cable 71 is supplied to a buffer register 79 and clocked in at $C_2$ clock time received over cable 57 from the timing and control signal generator. This character code, designated for convenience as $K_1 - K_{12}$ is then made available over cable 55 to the pattern generator 43 of the present invention. The timing relationship for the internally generated RAM addresses $A_0 - A_7$, the clock signals $C_1$, $C_2$, and the character codes read from RAM 75 is illustrated in FIG. 9.

The character code supplied over cable 55 to the pattern generator forms a portion of the address utilized to access the read only memory (ROM) array 83, 85 and 87 of the character pattern generator. Four bits of the character code $K_8 - K_{11}$ are supplied to a decoder 81 which selects one of the ROMS 83, 85, 87 in the array that make up the store for the character patterns. The remaining character bits $K_1 - K_7$ select a particular character pattern within the ROM selected by the output of decoder 81. Each character pattern is made up of an $N_1 \times N_2$ size matrix which may be a 12 × 12 bit matrix. The binary bits $Q_0$, $Q_1$, $Q_2$ and $Q_3$ supplied over cable 59 from the timing and control signal generator make up the remaining part of the address for the ROM array. These four bits select a particular row of the character matrix which has been addressed by $K_1 - K_{11}$. The clock signals $C_3$ supplied on cable 59 to the ROMS of the array cause the addressed character pattern to be read out over 12 line cable 101, line by line, to buffer register 89.

Clock signal $C_4$, supplied over cable 59, clocks these character pattern lines into the buffer 89 making each available over cable 103 to multiplexer 91. Multiplexer 91 serializes the 12 bits supplied to it over cable 103, under the control of signals $P_0$, $P_1$, $P_2$ and $p_3$, supplied to the multiplexer over cable 59 from the timing and control signal generator 47. The serialized bits are supplied over line 105 under the control of clock signal $C_5$ on line 59 from the timing and control signal generator 47 through AND gate 93 to serial shift register 95, 97, 99. As can be seen from the pulse diagram of FIG. 9, the clock signal $C_5$ provides for 2 bits of spacing between each 12 bits shifted into the serial shift register 95, 97, 99. This results in spacing between each character on the display device (not shown).

Shift register segments 95 and 97 have a storage length equal to the number of bits that can be displayed on one row of the display device being used, including the bit spaces between the characters. The clock signal CK supplied on line 59 from the timing and control signal generator 47 clocks in each bit of the data from AND gate 93. At the time data is made available over cable 61 to the local pattern conversion unit 45, register segment 97 will have stored therein all the bits necessary for display of the first line of a row of characters to be displayed. Register segment 95 will have therein all the bits necessary for the second line of that line of characters to be displayed. Register segment 99 will not have any bits therein until at least two bits have been processed. It should be remembered that the $Q_0$ - $Q_3$ signal supplied to the ROM array over cable 59 from the timing and control signal generator 47 selects a particular row of the character addressed. This row corresponds to the row being scanned on the display device (not shown).

The serial shift register 95, 97 and 99 essentially memorizes the two lines of data preceeding the row of the character matrix just read. The local matrix for each dot is extracted from this serial register array by way of cable 61 as a 3 $\times$ 3 matrix made up of bits $D_0$ - $D_8$. For purposes of example only, bit $D_8$ is the particular bit of the character matrix chosen to be expanded. Suffice it to say for the present that the 9 bits $D_0$ - $D_8$ retreived from the register array 95, 97 and 99 are bits from three different adjacent rows of a particular character matrix. Exactly how they are related will be more specifically described hereinafter. These nine bits are supplied over cable 61 to the local pattern conversion unit 45 which, in turn, produces a matrix that represents the expanded display form of bit $D_8$.

The local pattern conversion unit (FIG. 5) comprises a ROM 107, a buffer register 109 and a multiplexer 111. The 9 bits $D_0$-$D_8$, from the local pattern generator, address ROM 107 at clock time $C_7$, supplied to the ROM 107 over line 63 from the timing and control signal generator 47. The ROM reads out, over a cable 113 into a buffer register 109, a 9 bit array $F_0$ - $F_8$ which describes the expanded bit $D_8$. At clock time $C_8$, supplied to the buffer register over line 63, these 9 bits, $F_0$ - $F_8$ are supplied over cable 115 to a multiplexer 111. Out of these 9 bits, $F_0$ - $F_8$ presented to the multiplexer 111, the control signals $R_0$ - $R_3$, supplied to the multiplexer over cable 63 from the timing and control signal generator will select three of the bits which are in synchronous with the row scan signal of the display device. The relationship of the clock signals $C_7$, $C_8$ and the control signals $R_0$ - $R_3$ with the other control signals discussed so far can be seen in FIG. 9. The output SO of the multiplexer 111 on line 65 is the 3 bits selected for supply to the display device.

Figure 6:
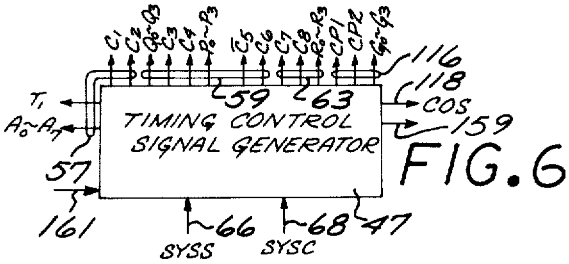
FIG. 6 is a block diagram illustrating part of the apparatus of FIG. 2.

As can be seen from FIG. 6 the various timing and control signals supplied to the apparatus of this invention are generated by the timing and control signal generator 47. The relationship of these signals are shown in FIGS. 9, 10 and 12. The specific hardware for generating these timing signals is seen as well within the purview of a person of ordinary skill in the art, and therefor, will not be discussed herein.

Figure 7:
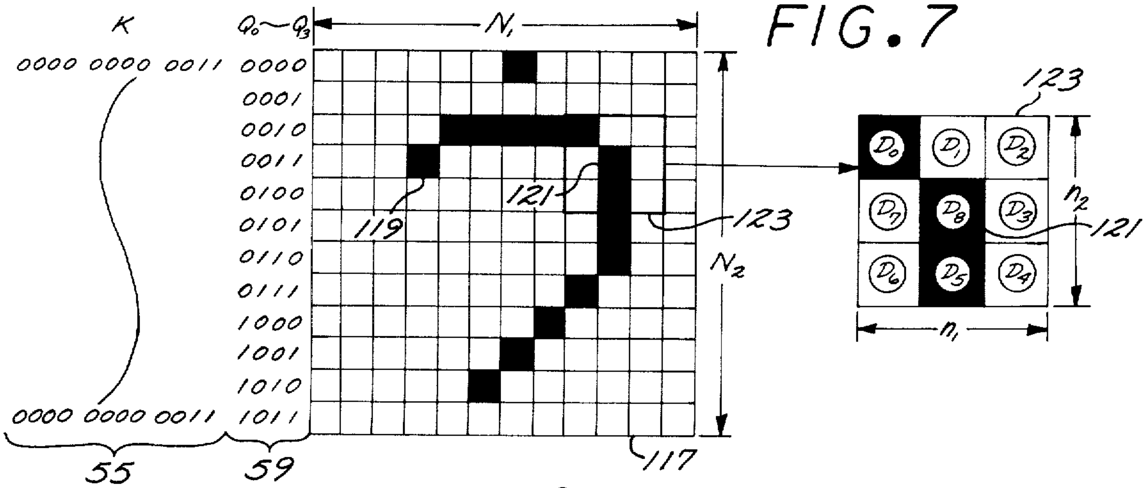
FIG. 7 is a diagram illustrating a specific example in the operation of this invention.

A functional description of the afore character generating hardware will now be provided in conjunction with a specific example. Assume that a character address $K_1$ - $K_{11}$, 55 is received by the ROMS 83, 85, 87 and addresses an $N_1 \times N_2$ character matrix 117 defining a character 119 as shown in FIG. 7. For the purposes of example, the matrix is shown as a 12 $\times$ 12 bit matrix. Upon having accessed this particular character matrix 117 the $Q_0$ - $Q_3$ row select signals 59 determine which row of that matrix is to be read out of the memory array. The row select signals are synchronized with the line scan of the display device by the timing and control signal generator 47.

Assume for the purposes of example that the $Q_0$ - $Q_3$ signals select rows 0010, 0011 and 0100 in that sequence. Consequently, the 12 bits of those 3 rows will be read out through the multiplexer into the register array 95, 97 99 spaced apart by the corresponding rows of other characters to be displayed on the respective scan lines of the display. The shaded blocks of the illustrated matrix represent, for example, binary one data and the unshaded blocks represent binary zero data. Assume now, for a particular incident in time that we are connected with the $D_0$ - $D_8$ output on cable 61 which is the 3 $\times$ 3 local matrix 123. The center dot 121 of dot matrix 123 is the one to be expanded.

As can be seen from the $n_1 \times n_2$ local matrix 123 extracted from the shift register array of FIG. 4, the 8 bits surrounding the central bit 121, including the central bit will determine the shape of the expanded bit to be displayed. For the purposes of example, the relation between the stored character matrix $N_1 \times N_2$ and the displayed character matrix $M_1 \times M_2$ is a factor of 3. That is, $N_1 = N_2 =$ 12, and $M_1 = M_2 =$ 36. Consequently, the bit $D_8$ to be expanded to display size must be expanded by a factor of 3.

Figure 8:
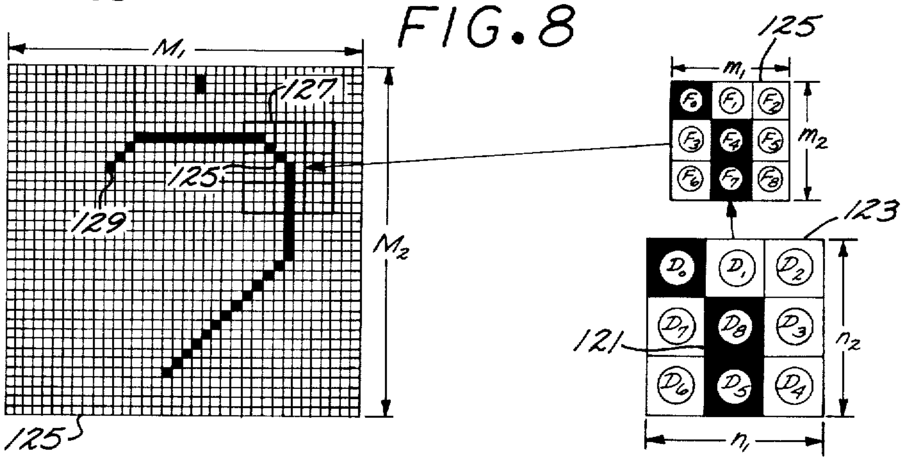
FIG. 8 is a diagram illustrating a specific example of the operation of this invention.

Referring now to FIG. 8, this means that the $n_1 \times n_2$ matrix 123 will eventually be expanded to a 9 $\times$ 9 matrix 127 in the $M_1 \times M_2$ display matrix 125. However, this will be done on a bit by bit basis. Consequently, the central bit $D_8$, 121, in the $n_1 \times n_2$ matrix will take the form of a 3 $\times$ 3 $m_1 \times m_2$ matrix 125. In this manner the stored character pattern 119 in an $N_1 \times N_2$ matrix format is expanded to the displayed character pattern 129 in an $M_1 \times M_2$ format.

The 9 bits $F_0$ - $F_8$ in the $m_1 \times m_2$ matrix 125 are obtained from ROM 107 (FIG. 5) when addressed by the 9 bits $D_0$ - $D_8$ of matrix 123. The character of the 9 bits of matrix 125 is determined by the $D_8$ bit 121 and its surrounding bits $D_0$ - $D_7$. The actual bit relationship between the $n_1 \times n_2$ matrix 123 and the $m_1 \times m_2$ matrix 125 was determined by experimentation. The overriding criterion in determining this relationship is that the display resulting from the generation of the $m_1 \times m_2$ matrices is of high quality.

In our example of going from a 3 × 3, $n_1 \times n_2$ local matrix 123 to a 3 × 3, $m_1 \times m_2$ display matrix 125, the binary contents of the ROM 107 would be as shown in Table A below:

TABLE A

| DECIMAL EQUIVALENT OF POINT TO BE EXPANDED AND ITS GLOBAL INFORMATION | | | | | | | | | | | | | | | EXPANDED POINT ARRAY |
|---|---|---|---|---|---|---|---|---|---|---|---|---|---|---|---|
| | | | | | | | | | | | | | | | $F_0$ - $F_8$ |
| 257 | | 261 | | 265 | | 269 | | 273 | | 275 | | 277 | | 279 | |
| 281 | | 285 | | 289 | | 293 | | 297 | | 301 | | 305 | | 309 | |
| 313 | | 317 | | 321 | | 325 | | 329 | | 330 | | 337 | | 339 | |
| 341 | | 345 | | 349 | | 353 | | 359 | | 361 | | 365 | | 369 | |
| 373 | | 377 | | 381 | | 387 | | 391 | | 395 | | 399 | | 401 | $F_1 = 1$ |
| 403 | | 405 | | 407 | | 411 | | 415 | | 419 | | 423 | | 427 | |
| 431 | | 435 | | 439 | | 443 | | 447 | | 451 | | 455 | | 459 | |
| 463 | | 465 | | 467 | | 471 | | 475 | | 479 | | 483 | | 487 | |
| 491 | | 495 | | 499 | | 503 | | 507 | | 511 | | | | | |
| 258 | | 259 | | 262 | | 263 | | 266 | | 267 | | 271 | | 274 | |
| 278 | | 282 | | 283 | | 290 | | 291 | | 294 | | 295 | | 298 | |
| 299 | | 306 | | 307 | | 310 | | 311 | | 314 | | 315 | | 322 | |
| 323 | | 330 | | 331 | | 338 | | 343 | | 346 | | 347 | | 354 | |
| 355 | | 358 | | 359 | | 362 | | 363 | | 370 | | 371 | | 374 | |
| 375 | | 378 | | 379 | | 386 | | 390 | | 391 | | 394 | | 395 | $F_2 = 1$ |
| 398 | | 399 | | 402 | | 406 | | 410 | | 411 | | 414 | | 415 | |
| 418 | | 422 | | 431 | | 434 | | 438 | | 442 443 | | 447 | | | |
| 450 | | 454 | | 458 | | 459 | | 462 | | 463 | | 466 | | 470 | |
| 474 | | 475 | | 478 | | 479 | | 482 | | 486 | | 490 | | 494 | |
| 495 | | 498 | | 502 | | 506 | | 507 | | 510 | | 511 | | | |
| 260 | | 261 | | 270 | | 271 | | 276 | | 277 | | 286 | | 287 | |
| 292 | | 293 | | 302 | | 303 | | 308 | | 309 | | 318 | | 319 | |
| 324 | - | 327 | | 332 | - | 335 | | 340 | - | 342 | 348 | | 350 | | |
| 351 | | 356 | | 357 | | 366 | | 367 | | 372 | | 373 | | 382 | |
| 383 | | 388 | | 389 | | 398 | | 399 | | 404 | | 405 | | 414 | $F_2 = 1$ |
| 415 | | 420 | | 421 | | 430 | | 431 | | 436 | | 437 | | 446 | |
| 447 | | 452 | | 453 | | 462 | | 463 | | 468 | | 469 | | 478 | |
| 479 | | 484 | | 485 | | 494 | | 495 | | 500 | | 501 | | 510 | |
| 511 | | | | | | | | | | | | | | | |
| 384 | - | 386 | | 388 | | 389 | | 390 | | 392 | - | 394 | | | |
| 396 | - | 398 | | 400 | | 402 | | 404 | | 406 | | 408 | - | 410 | |
| 412 | - | 414 | | 416 | - | 425 | | 428 | - | 451 | | 454 | | | |
| 456 | - | 462 | | 464 | | 466 | | 469 | | 470 | | 472 | - | 474 | $F_3 = 1$ |
| 476 | | 478 | | 481 | | 483 | | 486 | | 487 | | 491 | | 494 | |
| 495 | | 498 | | 499 | | 502 | | 503 | | 507 | | 510 | | 511 | |
| 256 | - | 266 | | 268 | | 269 | | 272 | - | 281 | | 284 | | 285 | |
| 288 | - | 299 | | 301 | | 304 | - | 311 | | 313 | | 317 | | | |
| 320 | - | 359 | | 361 | | 362 | | 365 | | 368 | - | 375 | | 377 | |
| 381 | | 384 | - | 386 | | 388 | | 389 | | 392 | - | 394 | | 396 | |
| 397 | | 400 | - | 410 | | 412 | | 413 | 416 | | 418 | | | | |
| 420 | - | 422 | | 424 | | 425 | | 427 | | 428 | | 430 | | 431 | $F_4 = 1$ |
| 434 | | 436 | | 437 | | 442 | | 443 | | 446 | | 449 | | 452 | |
| 453 | | 456 | - | 458 | | 460 | | 461 | | 464 | - | 473 | | 476 | |
| 477 | | 484 | | 485 | | 490 | | 491 | | 494 | | 495 | | 500 | |
| 501 | | 506 | | 507 | | 510 | | 511 | | | | | | | |
| 264 | - | 269 | | 280 | | 282 | - | 284 | | 286 | | 296 | - | 316 | |
| 318 | | 319 | | 328 | - | 331 | | 344 | | 346 | | 347 | | 349 | |
| 360 | - | 367 | | 378 | | 379 | | 382 | | 383 | | 392 | - | 397 | $F_5 = 1$ |
| 408 | - | 413 | | 424 | | 425 | | 427 | - | 429 | | 443 | | 446 | |
| 447 | | 456 | - | 461 | | 472 | - | 477 | | 488 | | 489 | | | |
| 490 | - | 495 | | 507 | | 570 | | 511 | | | | | | | |
| 320 | - | 351 | | 356 | | 357 | | 372 | | 452 | | 453 | | 468 | |
| 480 | - | 511 | | | | | | | | | | | | | $F_6 = 1$ |
| 256 | | 288 | - | 304 | | 306 | - | 308 | | 310 | | 311 | | | |
| 352 | - | 355 | | 358 | | 368 | | 370 | - | 376 | | 416 | - | 441 | |
| 443 | - | 445 | | 447 | | 488 | | 489 | | 492 | - | 496 | | | |
| 504 | - | 511 | | | | | | | | | | | | | |
| 272 | - | 279 | | 281 | | 285 | | 305 | | 309 | | 312 | - | 319 | |
| 336 | - | 343 | | 345 | | 369 | | 376 | - | 383 | | 400 | - | 407 | |
| 426 | | 440 | - | 447 | | 464 - | | 471 | | 504 - | | 511 | | $F_8 =$ 1 | |

Table A illustrates the contents of ROM 107 in decimal format because such format is more compact than the binary format. Take for example, the 9 points of our $n_1 \times n_2$ local matrix, 100001001. This 9 bit pattern addresses the ROM 107 and provides as its output the following 9 bits. $F_0 = 1$, $F_1 = 0$, $F_2 = 0$, $F_3 = 0$, $F_4 = 1$, $F_5 = 0$, $F_6 = 0$, $F_7 = 1$ and $F_8 = 0$. This output is derived from the tables in the following manner. Summation of the 9 binary bits $D_0$ - $D_8$ is 289 in decimal form. Therefor, looking in section $F_0$ of the table, a 289 decimal number is found therein defining $F_0$ as a binary 1. Looking in the $F_1$ section, 289 is not found therein, therefor $F_1$ is 0. Looking in the $F_2$ section, no 289 is found therein, therefor $F_2$ is 0. In the $F_3$ section, no 289 is found therein, therefor $F_3$ is 0. In the $F_4$ section, a 289 is found therein, therefor $F_4$ is a 1. In the $F_5$ section no 289 is found, therefor $F_5$ is a 0. In the $F_6$ section no 289 is found therein, therefor $F_6$ equals 0. In the $F_7$ section a 289 is found therein, therefor $F_7$ is a 1. In the $F_8$ section no 289 is found therein, and therefor $F_8$ is a 0. This display pattern generation continues for each local pattern array that addresses the ROM 107.

From the above example, the point $D_8$ of the local matrix is expanded to a 9 point matrix. However, this relationship should not be considered as limiting, because other different relationships between the local $n_1$ $\times$ $n_2$ matrix and the display $m_1 \times m_2$ pattern for the single point are equally possible. In Table B below, the contents of memory 107 are illustrated for a situation where a $3 \times 3$, $n_1 \times n_2$ matrix produces a $2 \times 2$, $m_1 \times m_2$ matrix.

TABLE B

| DECIMAL EQUIVALENT OF POINT TO BE EXPANDED AND ITS GLOBAL INFORMATION | | | | | | | | EXPANDED POINT ARRAY $F_4,F_5,F_7,F_8$ | | | |
|---|---|---|---|---|---|---|---|---|---|---|---|
| 257 | 258 | 259 | 260 | 261 | 262 | 263 | | | | | |
| 320 | 321 | 322 | 323 | 324 | 325 | 326 | | 1 | 0 | 0 | 0 |
| 327 | 334 | 335 | 348 | 350 | 351 | 372 | | | | | |
| 384 | 385 | 388 | 389 | 448 | 449 | 452 | | | | | |
| 453 | 484 | 485 | 500 | 501 | | | | | | | |
| 266 | 267 | 270 | 271 | 282 | 283 | 286 | | 0 | 1 | 0 | 0 |
| 287 | 395 | 411 | 459 | 474 | 475 | | | | | | |
| 264 | 265 | 258 | 269 | 280 | 281 | 284 | | | | | |
| 328 | 329 | 330 | 331 | 332 | 333 | 344 | | 1 | 1 | 0 | 0 |
| 345 | 346 | 347 | 349 | 392 | 393 | 394 | | | | | |
| 396 | 397 | 408 | 409 | 411 | 413 | | | | | | |
| | | | | 412 | | | | | | | |
| 456 | 457 | 458 | 460 | 461 | 472 | 473 | | | | | |
| 476 | 477 | 491 | | | | | | | | | |
| 416 | 417 | 419 | 423 | 432 | 433 | 435 | | 0 | 0 | 1 | 0 |
| 438 | 439 | 381 | 496 | 497 | | | | | | | |
| 288 | 289 | 290 | 291 | 292 | 293 | 294 | | | | | |
| 295 | 304 | 305 | 306 | 307 | 308 | 309 | | 1 | 0 | 1 | 0 |
| 310 | 311 | 352 | 353 | 354 | 355 | 356 | | | | | |
| 357 | 358 | 359 | 368 | 370 | 371 | 373 | | | | | |
| 374 | 375 | 418 | 420 | 421 | 422 | 431 | | | | | |
| 434 | 436 | 437 | | | | | | | | | |
| 296 | 300 | 302 | 303 | 303 | 360 | 363 | 364 | 0 | 1 | 1 | 0 |
| 366 | 367 | 429 | 443 | 488 | 489 | 492 | | | | | |
| 493 | 494 | 495 | | | | | | | | | |
| 297 | 298 | 299 | 301 | 361 | 362 | 365 | | 1 | 1 | 1 | 0 |
| 424 | 425 | 426 | 427 | 428 | 430 | 490 | | | | | |
| 40 | 41 | 42 | 43 | 44 | 45 | 46 | | | | | |
| 47 | 104 | 105 | 106 | 107 | 108 | 109 | | 0 | 0 | 0 | 1 |
| 110 | 111 | 168 | 169 | 170 | 171 | 172 | | | | | |
| 173 | 174 | 175 | 232 | 233 | 234 | 235 | | | | | |
| 236 | 237 | 238 | 239 | | | | | | | | |
| 256 | 272 | 273 | 274 | 275 | 276 | 277 | | | | | |
| 278 | 279 | 285 | 312 | 317 | 336 | 337 | | | | | |
| 338 | 339 | 340 | 341 | 342 | 343 | 369 | | 1 | 0 | 0 | 1 |
| 377 | 381 | 400 | 401 | 402 | 403 | 404 | | | | | |
| 405 | 406 | 407 | 464 | 465 | 466 | 467 | | | | | |
| 468 | 469 | 470 | 471 | | | | | | | | |
| 314 | 315 | 318 | 319 | 378 | 379 | 382 | | | | | |
| 383 | 511 | | | | | | | 0 | 1 | 0 | 1 |
| 466 | | | | | | | | 1 | 1 | 0 | 1 |
| 312 | 440 | 441 | 444 | 445 | 502 | 505 | | 0 | 0 | 1 | 1 |
| 508 | 509 | | | | | | | | | | |
| 506 | | | | | | | | 1 | 0 | 1 | 1 |
| 316 | 376 | 380 | 447 | 507 | 510 | | | 0 | 1 | 1 | 1 |
| 442 | | | | | | | | 1 | 1 | 1 | 1 |
| ALL OTHERS | | | | | | | | 0 | 0 | 0 | 0 |

In such a situation, the point being expanded is characterized in 4 instead of 9 points. The structure of FIG. 5 therefor, would be modified by the deletion of the $F_0$ - $F_3$, $F_6$ input and output lines at buffer 109 and multiplexer 111. The timing and control signals would also be modified to handle 2 bits per line instead of 3.

Table C below illustrates the contents of ROM 107 for the situation where a 4 bit local pattern is addressing ROM in order to obtain a 9 bit output.

TABLE C

| $D_3$, | $D_4$, | $D_5$, | $D_8$, | $F_0$, | $F_1$, | $F_2$, | $F_3$, | $F_4$, | $F_5$, | $F_6$, | $F_7$, | $F_8$, |
|---|---|---|---|---|---|---|---|---|---|---|---|---|
| 0 | 0 | 0 | 1 | 1 | 0 | 0 | 0 | 0 | 0 | 0 | 0 | 0 |
| 0 | * | 1 | 1 | 1 | 0 | 0 | 1 | 0 | 0 | 1 | 0 | 0 |
| 0 | 1 | 0 | 1 | 1 | 0 | 0 | 0 | 1 | 0 | 0 | 0 | 1 |
| 1 | * | 0 | 1 | 1 | 1 | 1 | 0 | 0 | 0 | 0 | 0 | 0 |
| 1 | 0 | 1 | 0 | 0 | 0 | 0 | 0 | 0 | 1 | 0 | 1 | 0 |
| 1 | 0 | 1 | 1 | 1 | 1 | 1 | 1 | 0 | 0 | 1 | 0 | 0 |
| 1 | 1 | 1 | 1 | 0 | 1 | 0 | 1 | 1 | 1 | 0 | 1 | 0 |
| ALL OTHERS | | | | 0 | 0 | 0 | 0 | 0 | 0 | 0 | 0 | 0 |

*Don't care

This would be the situation if the local matrix 123 were reduced down to the bits $D_3$, $D_4$, $D_5$, $D_8$. As can be seen, this relationship reduces the capacity of ROM 107 considerably.

Another example of a relationship is illustrated in Table D below where the ROM 107 responding to a 4 bit local pattern provides only a 4 bit output.

TABLE D

| $D_3$, | $D_4$, | $D_5$, | $D_8$ | $F_4$, | $F_5$, | $F_7$, | $F_8$ |
|---|---|---|---|---|---|---|---|
| 0 | 0 | 0 | 1 | 1 | 0 | 0 | 0 |
| 0 | * | 1 | 1 | 1 | 0 | 1 | 0 |
| 0 | 1 | 0 | 1 | 1 | 0 | 0 | 1 |
| 1 | * | 0 | 1 | 1 | 1 | 0 | 0 |
| 1 | 0 | 1 | 0 | 0 | 0 | 0 | 1 |
| 1 | 0 | 1 | 1 | 1 | 1 | 1 | 0 |
| 1 | 1 | 1 | 1 | 1 | 1 | 1 | 1 |
| ALL OTHERS | | | | 0 | 0 | 0 | 0 |

* Don't care

In other words, a $2 \times 2$ matrix is converted to a $2 \times$ matrix rather than a $3 \times 3$ matrix as was the case in Table C. As can be seen from Table D the storage capacity of ROM 107 is reduced even further.

The timing relationship between the various clock and control signals provided by the signal generator 47 to the above described hardware is illustrated in FIG. 9. The relationship shown illustrates what occurs each time one line 130 of a display device is generated, and more particularly a character portion of that one line. For each character an address $A_0$ - $A_7$ is provided to character code generator RAM 75. At clock time $C_1$ the character code is read out and at $C_2$ supplied to buffer 79. This character code addressed the ROM array 83, 85, 87 (FIG. 4) and at time $C_3$ reads out a particular line of the character matrix addressed. At time $C_4$, this character matrix line is supplied to buffer 89 and, in turn, to multiplexer 91. Signals $P_0$ - $P_3$ to multiplexer 91 serialize the 12 bits, supplying them to the shift register array 95, 97, 99 spaced by $C_5$ bit clock 59. Each bit of this 12 bit matrix line is clocked into the shift register by clock pulses Ck. Each time a new bit is clocked into the shift register array 95, 97, 99 a new local pattern $D_0$ - $D_8$ is generated on cable 61 and is supplied to read only memory 107. At clock times $C_7$, a 9 bit pattern $F_0$ - $F_8$ is read out of RAM 107 into buffer register 109 and made available to multiplexer 111 at clock time $C_8$. Each $C_8$ clock time, the $R_0$ - $R_1$ signals to the multiplexer 111 select 3 of the 9 bits supplied to it for distribution over line 65 to the display device (not shown). In this manner the first display line for a character 136 is generated.

In a like manner, a display line of a plurality of characters 132, 134, 136, for example, are generated in a combination thereof spaced apart by inter character spaces, as generated by the hardware of FIG. 4. The first scan line 130 of the display device is thus generated. A plurality of such scan lines make up one character line on the display device.

For our example of a 12 × 12 bit stored matrix being expanded to a 36 × 36 bit display matrix, FIG. 10 illustrates how an entire display page is generated. The stored matrix row selection signals $Q_0$ - $Q_3$ on cable 59 select a particular row of the stored matrix to be displayed. The selection signals $R_2$ and $R_3$ supplied to the multiplexer 111 (FIG. 5) select one of the three rows of the expanded local pattern to be displayed. In other words, for each row of bits stored in memory three rows of bits are generated. The particular row of the three generated rows chosen depends on the line scan signal for the display device. These line scan signals $R_2$, $R_3$ on cable 63 are in synchronism with the line scan signal. A single display line 130 is generated as a result of the signals shown in FIG. 9.

As shown in FIG. 10, a plurality of such lines, for our example, 36, make up one character row. Thus, the character 140 is displayed as a matrix 36 bits wide, (each one of the little boxes represent three bits), and 36 lines deep. Characters 142 and 144 are likewise generated. The horizontal blanking signal 138 is supplied to the display device by the timing and control signal generator 47 as part of the composite blanking signal (COS) 118.

For certain of the characters in the Japanese and Chinese alphabet because of the complexity of such characters it becomes extremely difficult and uneconomical to provide the character expansion described above. In such an instance it becomes more desirable to store the entire display size matrix in memory and read it out directly. This can be accomplished by the apparatus illustrated in FIG. 11 which will be explained subsequently, which stores, in effect, two different size character matrices. This can be accomplished by using alternate techniques and embodiments. For example, memory space may be segregated between the two different sizes of character matrices in which instance the memory address carries an indicia of which size character matrix is being addressed, causing the subsequent apparatus illustrated in FIG. 11 to be activated or deactivated accordingly.

The actual apparatus illustrated in FIG. 11 contemplates the use of memory storage wherein the two different size character matrices are integrated throughout the memory rather than segregated. In such an instance an indicia in the character matrix itself will indicate to subsequent hardware which size character matrix has been addressed. Assume for the sake of example, that the chosen matrix size for a particular stored character which is to be expanded for display purposes is a 12 × 12 matrix and that once expanded the display matrix will be a 36 × 36 matrix. The organization of the ROM array 83, 85 and 87 for the storage of these character matrices wherein the stored data indicates whether a 12 × 12 or a 36 × 36 matrix is to be read out of ROM is illustrated in Table E below.

TABLE E

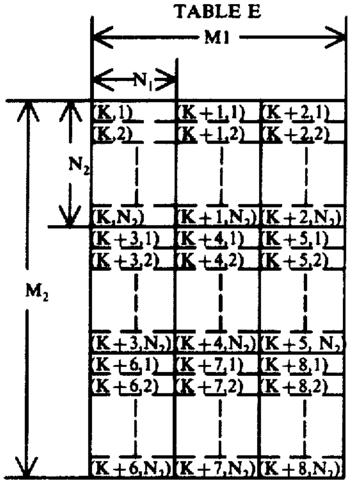

The memory array 83, 85, 87 can be thought of as being made up of a plurality of $M_1 \times M_2$ matrices where, for our specific example, $M_1 = M_2 = 36$. Each $M_1 \times M_2$ matrix in turn is made up of a plurality of $N_1 \times N_2$ matrices where $N_1 = N_2 = 12$. The $N_1 \times N_2$ matrices in most instances will store the complete character to be displayed. However, when the character is just too complex to be expanded according to the present invention, it must be stored at display size. In other words, the $M_1 \times M_2$ matrix size. In such an instance a flag bit (darkened square) is located at the first bit position of the first line and column of the first $N_1 \times N_2$ matrix of the many such matrices that make up the $M_1 \times M_2$ matrix. When such bit is detected, the hardware of FIG. 11 will cause the information in the $M_1 \times M_2$ matrix to be read out line by line in the following order. The bits in (K,1), then the bits in (K+1,1), then the bits in K+2,1), then the bits in (K,2), etc., until the bits in (K+2,$N_2$) and so on, until (K+8,$N_2$) the entire dot content of the $M_1 \times M_2$ matrix is read out, and provided to the display device.

The apparatus which may be utilized to perform in the manner described in connection with Table E is illustrated in FIG. 11. As can be seen in FIG. 11, in order to provide for the additional capability of reading out an $M_1 \times M_2$ matrix when such is required some additional hardware is necessary. Thus, an additional decoder 137, logic circuit consisting of inverter 147, AND gate 143, AND gate 145, OR gate 141, serial shift register 139, inverter 149, AND gate 151 and three bit serial shift register 153 are provided.

As was explained in connection with the operation of the apparatus of FIG. 4 the bits received on cable 55, bits $K_1$ through $K_{11}$, address a particular, in our example 12 × 12 $N_1 \times N_2$ bit matrix. The $Q_0$ through $Q_3$ bits received on cable 59 determine which line of that $N_1 \times N_2$ matrix is to be read out. Naturally, the first line is addressed first and read out of the ROM array 83, 85, 87 over cable 59 to the buffer 89. As this occurs the first bit of that line is sampled by line 157 and provided to AND gate 145. The other signal supplied to AND gate 145 is ZB on line 159. Signal ZB indicates when signals $Q_0$ through $Q_3$ and $R_2$ and $R_3$ are in their not state. For example, $Q_0$ through $Q_3$, $R_2$ and $R_3$, as can be seen from FIG. 10 are all binary 0 when the first line of the first row of characters is being read out of the RAM array 83, 85 and 87. This provides another binary 1 signal to AND gate 145, which passes a binary 1 to OR gate 141 thereby providing this binary 1 into shift register 139. Shift register 139 is equal in length to the number of characters in a full scan line.

When this binary 1 flag bit is shifted into register 139 it is provided on line 161 to inverter 149 and is a signal ZA to the timing and control signal generator 47 (FIG. 6). The inverter 149 causes AND gate 93 to be disabled, thereby effectually turning off the local pattern extraction apparatus made up of registers 95, 97, 99. The signal ZA supplied to the timing and control signal generator 47 causes the generation of sequencing signals $G_0$ to $G_3$ over cable 116 to decoder 137. The signals $G_0$ to $G_3$ cause the RAM array to be addressed as described in connection with Table E; that is, first row (K, 1), then row (K+1,1) in the next $N_1 \times N_2$ matrix, and so on.

$Q_0$ through $Q_3$, as explained earlier continues to provide for the sequencing of the rows in the entire $M_1 \times M_2$ matrix. That is, rows (K,1), (K,2) etc. As each row is read out of the RAM array into multiplexer 91, signals $P_0$ through $P_3$ cause the parallel bits received on line cable 103 to be serialized on line 105. These serial bits are provided to AND gate 151 which is enabled by the ZA signal provided from register 139 on line 161. Because of the logic circuit 147, 143, 141, 145 and register 139 it will be a binary 1 in the output of line 161 as long as that first line is being read out. At the time that the binary bits for the first line have all been supplied to the display device signal ZA will disable AND gate 151.

The output of AND gate 151 is supplied to a three bit serial shift register 153 which is utilized simply as a buffer or timing synchronizer. As can be seen from FIG. 12, it changes the timing of the bit information received at its input to the timing of the bit information supplied on line 155 to the display device.

The timing diagram of FIG. 12 shows the additional clock signals CP1 which drive the register 139 and CP2 which drive the register 153 and the additional control signals $G_0$ through $G_3$ which are supplied to decoder 137. Because the registers 95, 97 and 99 and apparatus of FIG. 5 are not utilized, the control signals such as $C_7$, $C_8$, $R_0 - R_3$, CK and $C_5$ are not shown in FIG. 12.

CONCLUSION

What has been shown is a character generator which is uniquely adapted for the display of very complex characters. Besides complex characters, the character generator has the capacity for generating a large number of different complex characters, all with the use of relatively small memory size for storing such characters. The stored character patterns of the character generator are expanded to the desired display size prior to display. This expansion occurs on a point by point basis, the expansion of each point in a character matrix being accomplished in relation to that point and its neighboring points. The character generator is adapted to store character matrices of different sizes. Whether the retreived stored character pattern is expanded is determined by either indicia in the stored information itself or by external means.

Obviously many modifications and variations of the present invention are possible in light of the above teachings. It is therefor to be understood that within the scope of the appended claims the invention may be practiced otherwise than as specifically described.

What is claimed is:

1. A character generator for display devices, comprising:

memory means for storing character patterns, each pattern being an $N_1 \times N_2$ matrix of binary data bits;

means for reading said $N_1 \times N_2$ matrix out of said memory means, line by line;

means for storing a plurality of the lines of the $N_1 \times N_2$ matrix read from memory in serial fashion, the length of said storing means being sufficient to store at least twice the number of bits required for generating the display bits required for one scan line on the display device;

means for extracting an $n_1 \times n_2$ matrix of binary data bits for each bit stored in said serial storing means; and means for generating an $m_1 \times m_2$ matrix of binary data bits in response to said $n_1 \times n_2$ matrix, said $m_1 \times m_2$ matrix defining said bit expanded to its display size.

2. The character generator of claim 1 wherein said $n_1 \times n_2$ matrix represents the data bit to be expanded and the data bits neighboring it.

3. The character generator of claim 1 wherein said memory means stores character patterns in $N_1 \times N_2$ matrices, said $N_1 \times N_2$ matrices being 12 bits × 12 bits of binary data.

4. The character generator of claim 1 wherein said means for extracting an $n_1 \times n_2$ matrix extracts a 3 bit × 3 bit matrix.

5. The character generator of claim 4 wherein said means for generating an $m_1 \times m_2$ matrix generates a 3 bit × 3 bit matrix.

6. The character generator of claim 1 wherein said means for generating said $m_1 \times m_2$ matrix comprises:

means for removing at least 2 bits from like positions of said serial store spaced apart by the number of bits required for the display of one scan line on the display device; and means responsive to the bits from said removing means for retrieving the corresponding $m_1 \times m_2$ bit matrix.

7. A character generator for character display devices utilizing an $M_1 \times M_2$ bit matrix to define a character to be displayed, said character generator comprising:

memory means for storing character patterns, each pattern being an $N_1 \times N_2$ bit matrix which is smaller than said $M_1 \times M_2$ bit matrix, and which $N_1 \times N_2$ bit matrix includes an $n_1 \times n_2$ bit matrix necessarily smaller than said $N_1 \times N_2$ bit matrix;

means for reading said $N_1 \times N_2$ bit matrix out of said memory means, line by line;

means for storing a plurality of the lines of the $N_1 \times N_2$ bit matrix read from memory in serial fashion, the length of said storing means being sufficient to store at least twice the number of bits required for generating the display bits required for one scan line on the display device;

means responsive to said $n_1 \times n_2$ bit matrix, for generating an $m_1 \times m_2$ bit matrix; and means for selecting a portion of said $m_1 \times m_2$ bit matrix for display.

8. The character generator of claim 7 wherein said $n_1 \times n_2$ bit matrix extracted by said extracting means represents a bit out of said $N_1 \times N_2$ matrix to be expanded and a plurality of adjacent bits.

9. The character generator of claim 8 wherein said $m_1 \times m_2$ bit matrix represents the expanded bit.

10. The character generator of claim 7 wherein said $n_1 \times n_2$ bit matrix extracted by said extracting means represents a bit of said $N_1 \times N_2$ matrix to be expanded and the bits surrounding it.

11. The character generator of claim 10 wherein said $m_1 \times m_2$ bit matrix represents the central bit of said $n_1 \times n_2$ bit matrix.

12. The character generator of claim 11 wherein said $n_1 \times n_2$ bit matrix comprises a $3 \times 3$ bit matrix and said $m_1 \times m_2$ bit matrix comprises a $3 \times 3$ bit matrix.

13. The character generator of claim 7 wherein said $N_1 \times N_2$ bit matrix comprises a $12 \times 12$ bit matrix, and said $M_1 \times M_2$ bit matrix comprises a $36 \times 36$ bit matrix.

14. The character generator of claim 7 wherein said means for generating said $m_1 \times m_2$ bit matrix comprises:

means for removing at least 2 bits from like positions of said serial store spaced apart by the number of bits required for the display of one scan line of bits on the display device; and means responsive to the bits from said removing means for retrieving the corresponding $m_1 \times m_2$ bit matrix.

15. A character generator for a character display device utilizing an $M_1 \times M_2$ bit matrix to define a character to be displayed, said character generator comprising:

memory means for storing character patterns of two sizes, one size character pattern being an $N_1 \times N_2$ bit matrix, the other size character pattern being an $M_1 \times M_2$ bit matrix;

means responsive to addressing a character in said memory means for detecting whether an $N_1 \times N_2$ or $M_1 \times M_2$ bit matrix is addressed;

means responsive to said detecting means detecting the addressing of an $M_1 \times M_2$ bit matrix for providing the $M_1 \times M_2$ bit matrix to be displayed;

means responsive to said detecting means detecting the addressing of an $N_1 \times N_2$ bit matrix for reading said $N_1 \times N_2$ matrix out of said memory, line by line;

means for storing a plurality of the lines of the $N_1 \times N_2$ matrix read from memory in serial fashion, the length of said storing means being sufficient to store at least twice the number of bits required for generating the display bits required for one scan line on the display device;

means for extracting an $n_1 \times n_2$ matrix of binary data bits for each bit stored in said serial storing means; and means for generating an $m_1 \times m_2$ matrix of binary data bits in response to said $n_1 \times n_2$ matrix.

16. The character generator of claim 15, further comprising:

means for selecting a portion of said $m_1 \times m_2$ bit matrix for display.

17. The character generator of claim 15 wherein said memory means comprises a first and second memory means, said first memory means storing said $N_1 \times N_2$ bit matrix character pattern, said second memory means storing said $M_1 \times M_2$ bit matrix character pattern.

* * * * *